Patented July 28, 1936

2,048,990

UNITED STATES PATENT OFFICE 2,048,990

1,3-DIAMINO-2-METHYL PROPANOL-2

Edgar C. Britton and Howard S. Nutting, Midland, Mich., assignors to The Dow Chemical Company, Midland, Mich., a corporation of Michigan No Drawing. Application October 7, 1935, Serial No. 43,922

1 Claim. (Cl. 260—127)

The present invention relates to the preparation of diamino-tertiary butyl alcohol, which is more specifically identified as 1,3-diamino-2-methyl propanol-2.

We have prepared the aforementioned compound, determined certain physical properties thereof whereby it may readily be identified, and have found that it may advantageously be used for various purposes, for example, in the absorption of hydrogen sulphide from gases and as an agent to inhibit the action of acids upon metals. The invention, then, consists of the new product hereinafter fully described and particularly pointed out in the claim.

We have found that 1,3-diamino-2-methyl propanol-2 may be prepared by the ammonolysis of dichloro-tertiary butyl alcohol. A second method of preparing this compound consists in the ammonolysis of chlorobutylene oxide.

The following example shows in detail one of the methods used in preparing our new compound:

Example

Over a period of 1 hour 300 grams (2.1 mols) of dichloro-tertiary butyl alcohol was added at a substantially uniform rate, with stirring, to 7 liters (84 mols) of concentrated (30 per cent) ammonia solution, the temperature during the reaction being between about 18° and 33° C. Stirring was continued for one-half hour after all of the alcohol had been added, whereupon 4.2 mols of dilute aqueous sodium hydroxide was added to the mixture, the water and ammonia distilled therefrom, and the product separated from the sodium chloride by extraction with alcohol. The alcohol was removed by evaporation and the product was distilled under a pressure of 6 millimeters absolute to obtain 1,3-diamino-2-methyl propanol-2, which boiled at 101–105° C., the yield being 65.6 per cent of theoretical.

This compound is a water-white, sirupy liquid at room temperatures, with a melting point of 12° C., a boiling point of from 101° to 105° C. at a pressure of 6 millimeters of mercury absolute. The specific gravity of the compound is 1.059 at 20°/20° C., and the refractive index is 1.495 at 20° C. The compound is soluble in water, alcohol, acids, and dilute aqueous alkali.

Other methods of applying the principle of our invention may be employed instead of the one explained, change being made as regards the materials employed, provided the product defined in the following claim is thereby obtained.

We therefore particularly point out and distinctly claim as our invention:—

1,3-diamino-2-methyl propanol-2.

EDGAR C. BRITTON.
HOWARD S. NUTTING.